(12) United States Patent
Jeon

(10) Patent No.: US 6,524,734 B1
(45) Date of Patent: Feb. 25, 2003

(54) AIRFLOW SYSTEM OF METAL-AIR BATTERY

(75) Inventor: Jong Woong Jeon, Seoul (KR)

(73) Assignee: Icelltech Corp., Seoul (KR)

( * ) Notice: Subject to any disclaimer, the term of this patent is extended or adjusted under 35 U.S.C. 154(b) by 98 days.

(21) Appl. No.: 09/710,451

(22) Filed: Nov. 10, 2000

(51) Int. Cl.[7] .......................... H01M 12/06; H01M 8/04
(52) U.S. Cl. ........................ 429/27; 429/34; 429/176
(58) Field of Search .................... 429/27, 175, 176, 429/34

(56) References Cited

U.S. PATENT DOCUMENTS

| | | |
|---|---|---|
| 4,181,776 A | 1/1980 | Lindstrom .................. 429/27 |
| 4,262,062 A | 4/1981 | Zatsky ....................... 429/27 |
| 4,404,266 A | 9/1983 | Smilanich .................. 429/27 |
| 4,591,539 A | 5/1986 | Oltman et al. ............. 429/27 |
| 4,687,714 A * | 8/1987 | Oltman et al. ............. 429/27 |
| 5,306,580 A * | 4/1994 | Mansfield, Jr. et al. ..... 429/175 |

* cited by examiner

Primary Examiner—John S. Maples

(57) ABSTRACT

The present invention is relates in a metal-Air battery, which called coin cell generally, having a cathode in the container wherein anode top filled with electrolyte is placed with gasket in between. In this battery structure, air chamber is provided between the cathode and cathode container, and cathode is being abutted by embossed polarity mark to maximize a gas diffusion passage from a port to peripheries of cathode providing clearance of air chamber between peripheries of cathode container and cathode. This air passage provides sufficient and rapid airflow makes a cell operate at maximum performance and extend cell lifetime.

3 Claims, 3 Drawing Sheets

AIRFLOW SYSTEM OF METAL-AIR BATTERY

BACKGROUND OF THE INVENTION

1. Field of the Invention

The present invention relates to a metal air battery, generally called a coin cell, having a cathode in the container. The shape of metal-air batteries in general is disk shaped with diameter of less than 25.4 millimeters and a height under 12.7 millimeters. As shown in FIG. 1, a metal-air battery should have at least one port on the cathode container bottom for exchanging gas outside the battery so that oxygen in the air acts as a cathode.

2. Description of the Related Art

As shown in FIG. 3, cathode container (1) has an open end and a closed end. The bottom side (2) of the closed end has a port (3). Inside the container (1) is hydrophobic film (4) made of PTFE (Teflon) film and a cathode (5). Electrolyte (8) is housed in an anode container (7) having the open end thereof extending into the cathode container and having a gasket (6) compressed between the anode and the cathode containers.

Insufficient airflow in a metal-air battery can result in poor performance and can shorten the battery life. When metal-air batteries are stored, they are generally sealed with adhesive tape to prevent air diffusion during storage. When removed from storage the metal-air battery needs to be activated by removing adhesive tape and allowing air flow into the battery. The air flow necessary to activate the battery and maintain useful performance and lifetime, however, is often more than what can be received through the port.

SUMMARY OF THE INVENTION

The present invention relates to metal-air batteries that address the aforementioned concerns. The purpose of the invention is to improve current drain, shorten activation time after peeling off the seal sticker and maximize battery lifetime by creating a system of gas diffusion passages which provide air chambers between the cathode container and the cathode.

DETAILED DESCRIPTION OF THE PREFERRED EMBODIMENT

Figure 1:
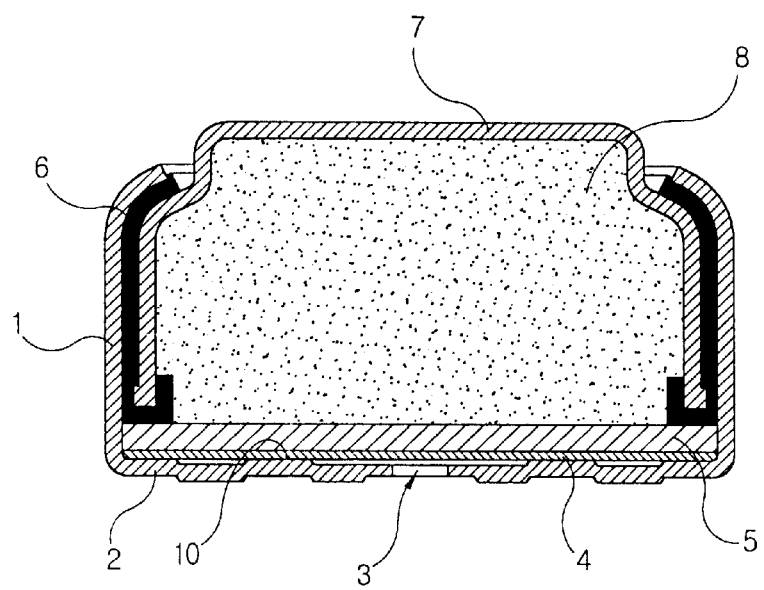
FIG. 1 is cross sectional view of a metal-air battery incorporating the present invention.
Figure 2:
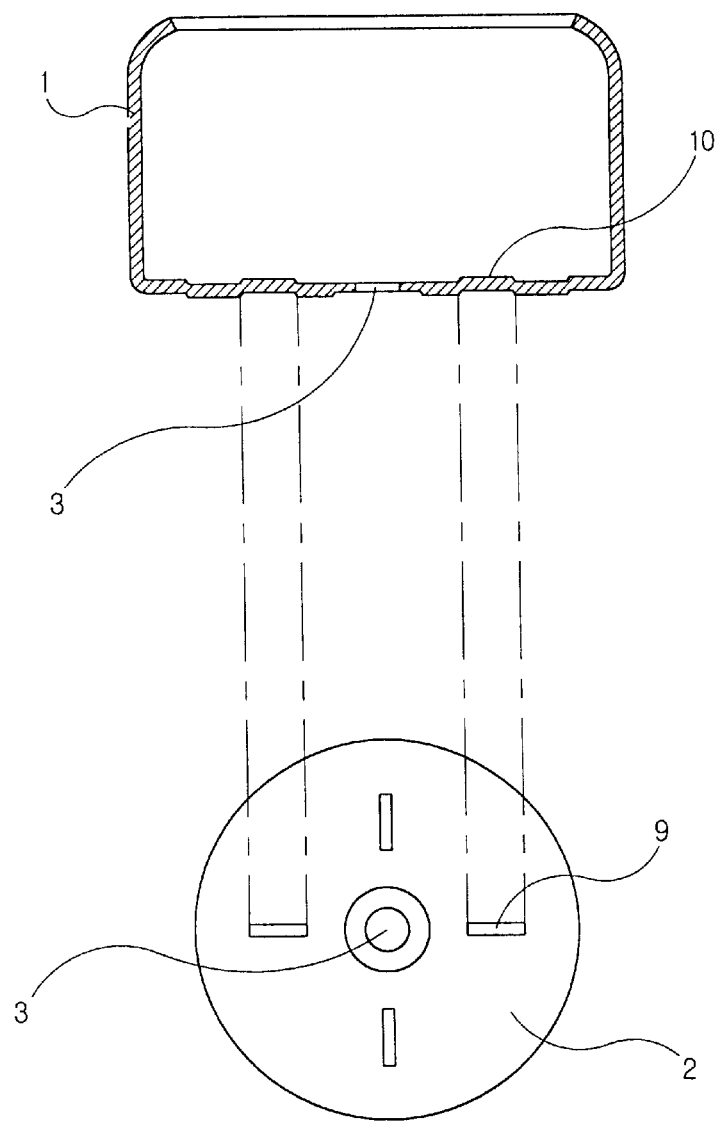
FIG. 2 is a cross sectional view of the cathode container of the present invention showing the bottom of the cathode container removed therefrom.
Figure 3:
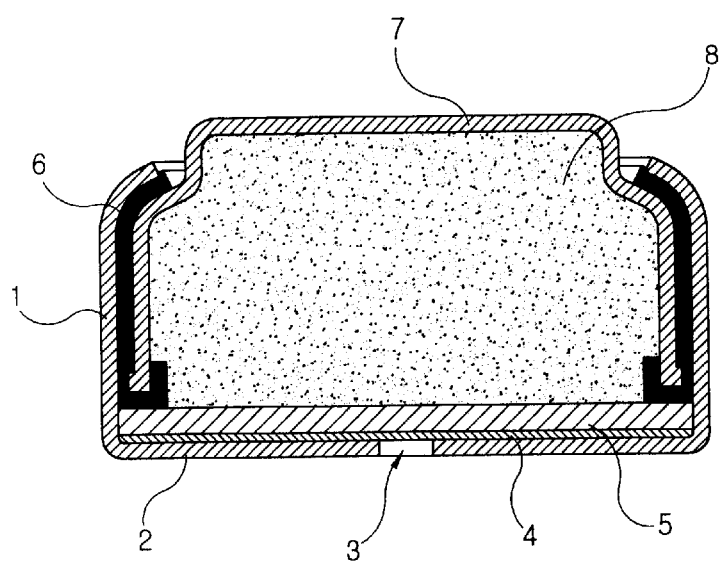
FIG. 3 is a cross sectional view of existing metal-air battery.

The following is a detailed explanation of the preferred embodiment of the present invention. The purpose of the invention is to provide an air flow system which defines gas diffusion passages communicating smoothly with the battery port and cathode resulting from embossing polarity identification marks towards the inside of the cathode container. A detailed description of the figures follows.

A steel cathode container (1) having one open end and one closed end is provided with a port (3) centrally placed on the container bottom (2). The cathode container is also provided with a hydrophobic film and cathode assembly (5), electrolyte (8) housed in an anode container (7), the open end of which extends into the cathode container with a gasket (6) compressed therebetween.

Polarity identification marks (9) adjacent to air port (3) are inwardly embossed on the cathode container bottom (2), contacting the PTFE (Teflon) film (4) attached to the cathode. In this manner, air passageways are created between the cathode and the cathode container.

The embossed polarity identification marks (9) are limited in area so as not to weaken the cathode. The embossed height should be maintained between 0.025 millimeter and 0.15 millimeter to provide a sufficient air passageway, and to maintain the physical strength of the cathode container so as to avoid any distortion of the cathode container and prevent air chocking.

In order to prevent a metal-air battery with this structure from wearing out during storage, an adhesive seal sticker is placed on the port to cut airflow, thereby preventing activation of the battery. When ready to use, the adhesive seal sticker is peeled off, allowing air to be brought into the battery. Oxygen acts as a cathode when it contacts the cathode in the container. In this way we get current drain.

The metal-air battery of the present invention can be activated fully and quickly because sufficient airflow passes into the battery through the air chamber created by the embossed polarity identification mark.

As stated above, this invention relates to metal-air battery having improved air flow system between the cathode container and the cathode. The system results in good current drain, shortens activation time, and maximizes battery life time.

What is claimed is:

1. A Metal-air battery having a cathode (5) in a cathode container (1), an anode and electrolyte (8) in a housing comprising an anode container (7), an open end thereof extending into the cathode container with a gasket (6) compressed between the cathode and the anode containers and wherein, when assembled, said cathode container (1) having a port (3) centrally placed in a bottom (2) thereof for exchanging gas outside of the battery, an airflow system having a Polarity identification mark (9) adjacent to port (3) embossed inwardly towards the cathode container and contacting PTFE (Teflon) film (4) attached to said cathode.

2. The airflow system of the Metal-Air battery as claimed in claim 1, providing an air passage between the cathode container (1) and the cathode (5) created by the embossed polarity identification mark (9).

3. The airflow system of Metal-Air battery as claimed in claim 1 or 2, wherein said embossed polarity identification mark is over 0.025 millimeter but less than 0.15 millimeter to maintain clearance between cathode container and cathode.

* * * * *